June 11, 1963

D. D. WILLIAMS 3,093,001

GAS SAMPLER

Filed Feb. 1, 1960

INVENTOR
DALE D. WILLIAMS

BY *Richard C. Reed*

ATTORNEY

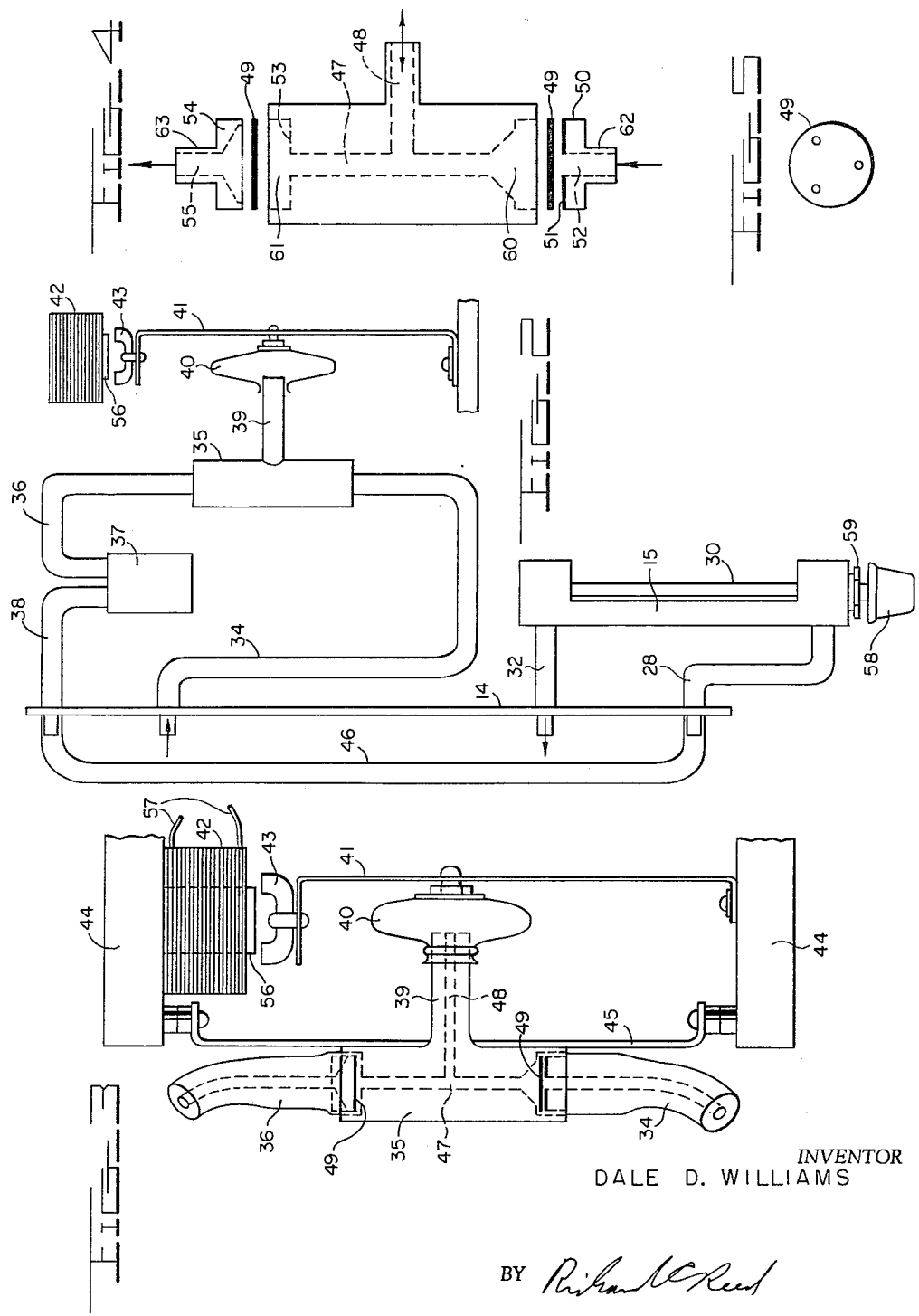

United States Patent Office 3,093,001
Patented June 11, 1963

3,093,001
GAS SAMPLER
Dale D. Williams, 1702 Tucker Ave., McLean, Va.
Filed Feb. 1, 1960, Ser. No. 6,071
2 Claims. (Cl. 73—421.5)
(Granted under Title 35, U.S. Code (1952), sec. 266)

The invention described herein may be manufactured and used by or for the Government of the United States of America for governmental purposes without the payment of any royalties thereon or therefor.

The invention relates to an apparatus employed in sampling a gas, more particularly, to an apparatus which accurately draws air or other gases at a suitable low rate for any desired time interval.

Laboratory pneumatic pumps and flow-meters have been employed in drawing and measuring relatively small quantities of air or other gases for sampling purposes, but such laboratory set-ups require considerable time in assembling and adjusting them to flow rates of a liter or less per minute. With the usual laboratory equipment it is often necessary to bleed large volumes of air or other gases in order to provide gas sampling at relatively low rates of flow, special attention being often required for the disposition of the large excess. Pump fluids are easily contaminated with impurities contained in the sampled air, resulting in frequent maintenance delays. Makeshift laboratory equipment, which are assembled as gas samplers, are for the most part inconvenient and often inaccurate in operation and scarcely, or not at all, adaptable for routine investigations in convenient portable form.

In colorimetric gas investigations of the type which detect and measure a particular gas through color changes in chemical ingredients contained in glass tubes, simple aspirator bulbs are used to introduce gaseous samples into the tubes. Manually operated samplers of this kind are disadvantageous, since they are limited to definite volumes of air at each manipulation of the aspirator bulb, and sampling periods require continuous manipulation of the bulb to maintain an estimated flow. Admittedly, manually operated devices such as these do not lend themselves to precise investigative techniques.

While this invention is concerned principally with an apparatus conveniently mounted and adapted to facilitate laboratory needs for relatively small quantities of air or gas, the invention is especially applicable to colorimetric gas investigations in which the novel apparatus passes a definite quantity of air through colorimeter tubes at a definite flow rate and for a predetermined time interval to indicate the extent of a certain gas or vapor in the sampled air by means of color changes that take place in the colorimeter tubes. The invention therefore contemplates the use of the present device in routine gaseous investigations for detecting and measuring the presence of toxic vapors.

Hence, one object of the present invention is to provide a novel gas sampler designed for accurate delivery of a given volume of air or gas at flow rates of a liter or less per minute.

Another object of the present invention is to provide an apparatus conveniently mounted and adapted to pump relatively small volumes of air or other gases at relatively low rates of flow and for any predetermined time interval.

A further object of the invention concerns an automatic gas sampler which is compact, readily portable, operates electrically and requires a minimum of attention during the sampling operation.

A still further object of the invention is to provide a novel gas sampler which delivers a definite quantity of gas in a given time interval and which can reproduce the sampled quantity repeatedly with great accuracy.

A still further object of this invention is to permit an enclosed atmosphere to be investigated by means of the present apparatus for the purpose of detecting and measuring toxic vapors contained therein.

Numerous other objects and features of the invention will be readily apparent from consideration of the following detailed description when considered in connection with the accompanying drawings in which like reference numerals designate like parts throughout the figures thereof and wherein:

FIG. 2 is a flow diagram of the sampler assembled in accordance with one embodiment of the invention;

FIG. 3 is a diagrammatic view of the pump assembly showing the vibrator, diaphragm valve and the valve housing;

FIG. 4 is an exploded view showing parts of the valve housing;

FIG. 5 illustrates the flexible wafer used in the inlet and outlet valves.

Figure 1:
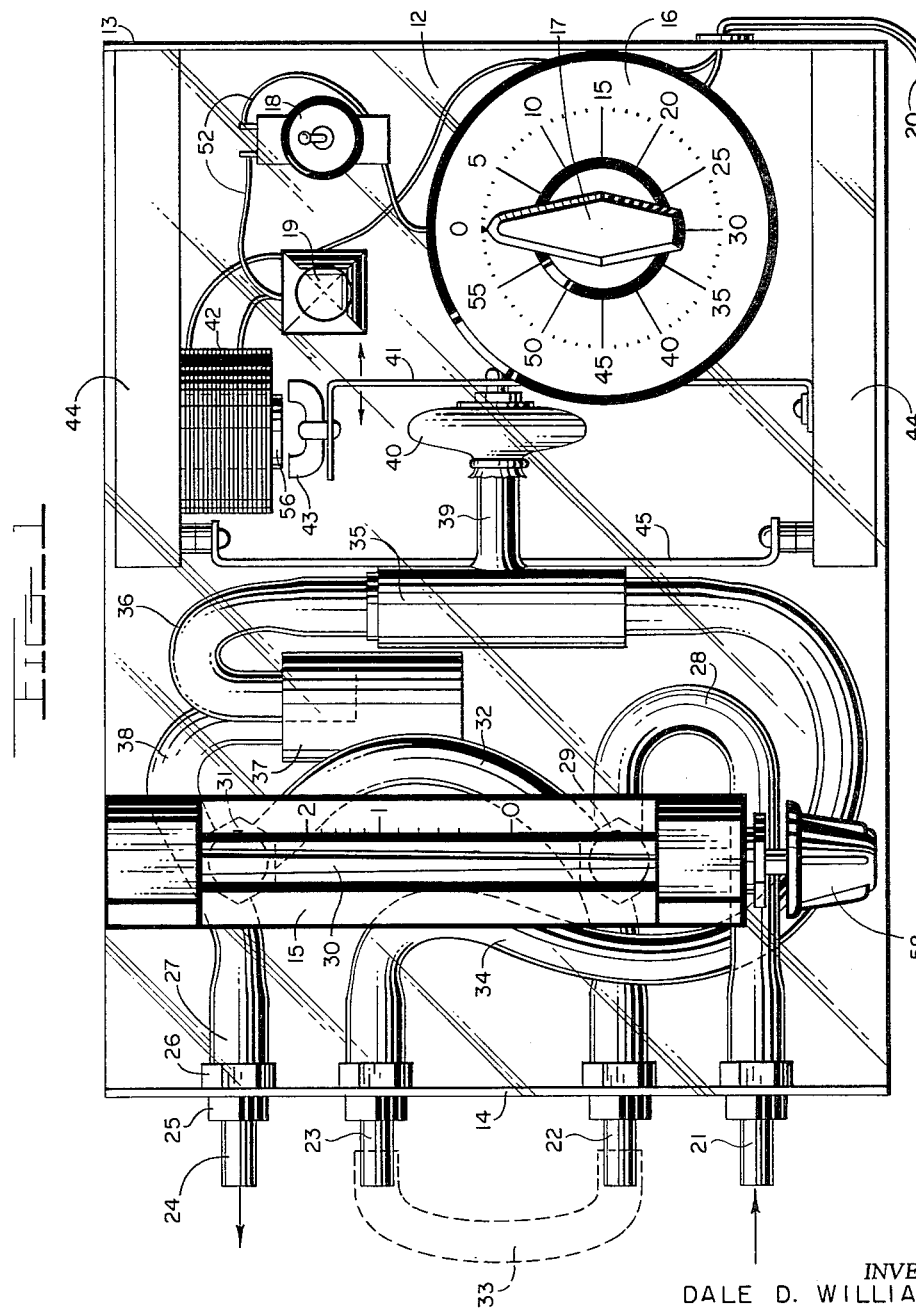
FIG. 1 illustrates a front view of the gas sampler in which the front panel is shown in transparency for purposes of illustration.

Referring now to the drawings, there is shown in FIG. 1 a preferred embodiment of the invention in convenient portable form consisting of a casing, chassis or panel mounting in or on which are located the gas induction means and other parts of the apparatus. By way of example the apparatus may be mounted, as shown in FIG. 1, on a panel 12 extending at right angles from each end thereof to form sides 13 and 14. The panel may be constructed of sheet metal bent to form the sides thereof, or it may be assembled from individual sections and may further take the form of a chassis or a complete casing constructed of any durable material, such as plastic, fiber board, wood, leather, etc. The face panel in FIG. 1 is shown in transparency for convenience in illustrating the parts mounted to the rear of said panel.

A flow-meter 15, equipped with a regulator valve 58, is mounted in front of the face panel 12 for ready reference in determining the flow of gas; said flow-meter is designed and graduated to deliver rates of a liter or two of gas per minute, and, preferably, the graduations should be in fractions of a liter, or in milliliters for greater accuracy in adjusting flow rates. An interval switch or timer 16 is also mounted on the face panel 12; the timer indicated knob 17 may also control a contact switch (not shown) which completes the electric circuit and activates the device whenever the knob is moved to any designated time interval. A toggle switch, shown at 18, may be used with or in lieu of a contact switch to complete the electric circuit and operate the device in the manner described below. A pilot light 19 may also be installed on the face of the panel to provide visual means that the device is in operation. Connecting posts 21—24 are shown mounted on side 14; said posts provide tubular connections for linking the apparatus with flexible tubing to reservoirs, sample lines, air ducts, etc., and also for delivering small quantities of air, gas or vapor to equipment, detector tubes, reaction vessels and the like. Each of the tubular connecting posts 21—24 consists of a section of rigid tubulation that passes through side wall 14 and is fastened thereto by means of a tapered, shaft-locking nut. This locking arrangement which is described with reference to connecting post 24 consists of a wide bushing 25 having a hollow, threaded, slitted shaft (not shown) extending from said bushing through side wall 14, the hollow shaft providing the opening through which the tubulation is passed, and a tapered nut 26 squeezes the slitted shaft tightly against the tubulation to obtain a tightly-clamped tubular post. That portion of the tubulation which passes through the side wall, receives the end of the flexible conduit, as shown at 27, and in order to assure an air-tight connection, a cement composition is applied between the tubulation and the flexible conduit.

Flexible conduit lengths connect the tubular posts 21—24 interiorly with the other parts of the apparatus: Conduit 28 connects the inlet post 21 with inlet port 29 at the lower, rear end of the flow-meter 15; gas flowing through inlet port 29 passes vertically through calibrated bore 30 and out of the flow-meter 15 through outlet port 31 at the top, rear end of the flow-meter. Conduit 32 connects the outlet port 31 of the flow-meter with tubular post 22. Conduit 33, shown in the drawing in dotted outline, is used to connect posts 22 and 23 in accordance with one embodiment of the invention, i.e., when it is desired to meter the gaseous flow that enters the device. A different exterior connection, one which is described in detail with reference to FIG. 2, is employed when it is desired to meter the quantity of gas that the apparatus is delivering. Conduit 34 connects tubular post 23 with the inlet of valve housing 35 and the outlet of said housing is connected by conduit 36 to a muffler unit 37. Conduit 38 connects the outlet of the muffler 37 with the outlet post 24, thereby completing the tubular circuitry which is necessary for delivering gaseous quantities by means of the present apparatus.

Insulating platforms 44, attached to the top and bottom of the panel, and support bar 45 provide means for securing the vibrator coil 42, valve housing 35, vibrating arm 41 and flexible bellows 40. The platforms 44 may be made of Bakelite, plastic, hard rubber, or any other suitable insulating material and may be mounted to the panel by any convenient means. Valve housing 35 is rigidly supported by means of support bar 45 by welding or braketing the housing thereto. Although only one support bar is shown, it is understood that any number may be mounted between the insulated platforms in any desired pattern to obtain a rigid construction.

The electric circuit, shown in FIG. 1, connects the interval switch (not shown), if one is provided in the circuit, the toggle switch 18 and vibrating coil 42 in series, while the pilot light 19, when it present, is connected in parallel with the vibrating coil 42. The A.C. wire cord 20, shown entering the apparatus through side wall 13, is connected to the vibrator coil and to the interval switch.

The pump means of the present invention comprises a valve housing 35, a rubber bellows 40, a vibrating arm 41 and a vibrator coil 42; the combination thereof forms the pump assembly that provides the necessary pumping action in accordance with the present invention. Construction of the pump assembly will now be described in detail with reference to FIG. 3 and FIG. 4. The valve housing 35 consists of a cylindrical body having a central channel 47 across its longitudinal axis; a side arm 39 extending from the body of the cylinder is provided with a transverse channel 48 communicating with the central channel 47. At each end of the cylindrical structure, annular chambers 60 and 61 provide housings for the inlet and outlet valves. On the inlet side of the cylinder, the annular chamber 60 tapers into a conical space and finally merges with the central channel 47. An annular plug 50 is adapted to be inserted into the annular chamber; the central portion of said plug is channeled to the dimension of the central channel in the cylinder so that when it is inserted into the annular chamber 60, as shown in FIG. 3, a uniform air passage is provided throughout the cylinder and the attached plug thereto. A narrow stem 62 extends from the plug and provides in the assembled valve, shown in FIG. 3, a rigid connecting means to which flexible conduit 34 is readily attached. The surface 51 on the annular plug forms a valve seat for wafer valve 49. The wafer valve 49, shown in more detail in FIG. 5, is a thin membrane preferably made of plastic material such as polyethylene or polyvinyl chloride, but which may also be formed of a rubber-type composition. The wafer valve, as shown in FIG. 5, has small openings in the outer periphery thereof; the exact number of openings in the wafer is not critical, although it is important that they be confined to the part of the wafer that seats on valve surface 51; the center of the wafer seals the central passage and should be impervious to the passage of gas. In assembling the inlet valve, the wafer 49 is inserted in the annular chamber 60 and annular plug 50 is then fitted tightly into the chamber, as shown in FIG. 3. Flexible conduit 34 is fitted over the stem 62 to form a continuous air passage through the valve housing.

On the outlet side of the cylinder, annular chamber 61 is cylindrical in shape; the base 53 of said chamber provides the surface on which wafer valve 49 is seated. Annular plug 54 is adapted to be inserted into annular chamber 61 forming a tight fit therein, while a narrow stem 63 which extends from said plug forms a connecting means for conduit 36. A channel 55 through said stem widens into a conical space in the main body of the plug, and said conical space is retained in the assembled outlet valve over wafer 49.

The flexible bellows of the present invention is of rubber composition and may be conveniently made by cutting a single convolution from a corrugated rubber bellows tubing, for instance, a suitable corrugated bellows is used in the Navy, type B rebreather. The corrugated bellows tubing is cut at the narrow diameter, care being taken to allow sufficient material on each side of the convolution to provide a good seal and form firm attachments. The convolution is sealed on the one side by cementing a pair of washers to the inner and outer surfaces of the rubber, and by passing a threaded bolt through the washers, it is then secured by means of a nut to the vibrating arm 41. The other side of the convolution is slipped over side arm 39 and cemented thereto with a rubber cement, and a wire clamp is drawn tightly around the cemented surface. Although actual dimensions of the flexible bellows are not critical, it is, however, important to achieve a convolution of a certain size, so that it can achieve positive displacement of air at each cycle of the vibrating arm. If the flexible bellows is too large, the air volume within distributes itself at each compression and there is little or no transmittance of air compression to the valve housing. A bellows tubing which has been cut and found to produce suitable flexible bellows has an inside diameter of 1$\frac{15}{32}$" at the widest part of the tubing. Of course, it is understood that other size tubing may also be employed for the purposes of forming diaphragm valves and that the shape of the bellows may also be varied.

One side of the bellows is connected to the valve housing 35 through the side arm 39 forming a stationary attachment thereto, while the other side is attached to the vibrating arm 41. The vibrating arm 41 is rigidly fastened at one end, while the free or vibrating end thereof is bent to receive a permanent type U-shaped magnet 43. Positioned near the magnetic poles of said magnet is a vibrator coil 42 whose iron core 56 causes the magnetic poles on the vibrating arm to shift position relative to the iron core, whenever an alternating current passes through the coil. The vibratory motion of the arm causes the enclosed air in the bellows space alternately to become compressed and expanded.

According to the invention, the assembled unit may be operated in one of two ways: In the illustration of FIG. 1, the external connection of conduit 33 across the posts 22 and 23 permits the gaseous sample to be metered as it enters the apparatus and prior to its entry into the valve housing, so that an accurate flow rate is obtained of the gas sample as it is drawn into the apparatus. However, in other instances, it is more desirable to know accurately the amount of sample which the unit delivers at the outlet and, for this purpose, FIG. 2 shows the apparatus connected in a continuous circuit, initially through the valve housing 35 and subsequently through the flow-meter 15 thereby measuring the quantity of gas delivered at the outlet. In the embodiment illustrated in FIG. 2, the gas is drawn into valve housing 35 through conduit 34 and then pumped into muffler 37. Although a muffler is not essential for the purposes of this invention, it is found that passage of the gas into a large reservoir produces a smoother gas output relatively free from the rippling effect of a vibrating pump unit. In the embodiment of FIG. 2, the gas emerging from the muffler passes through conduit 38 across the external conduit connection 46 (which is now between posts 21 and 24 of FIG. 1) and from there into the flow-meter through conduit 28.

For a better understanding of the manner in which the present device operates, reference is had to FIGS. 3 and 4 and to a colorimetric test for the purpose of illustrating a particular usage of the present gas sampler. A colorimeter tube of the type referred to in the patent application, Serial No. 849,992, filed on October 30, 1959, by the instant inventor and which has issued as Patent No. 3,025,142, has been used for determining extremely small amounts of ammonia or organic amine vapor present in the atmosphere by measuring the extent of coloration which appears in the enclosed ingredient. A colorimeter tube of this type is initially opened at both ends and one end is inserted in a rubber tube and the other end of the tube is connected to the outlet post from conduit 32 of FIG. 2. The timer is set for a 15 minute sampling period and the flow-meter adjusted to deliver ⅓ of a liter of air per minute.

When the vibrator coil 42 is connected to an A.C. source, the iron core of the coil produces a changing magnetic field causing the vibrating arm 41 to shift positions rapidly, resulting in a uniform vibratory motion. The vibrating arm which is linked to the diaphragm valve 40 compresses the enclosed volume of air. The compression of the air volume is transmitted through side arm 39 to the valve housing where the slight force applied at the outlet valve causes the wafer to move away from its seated position 53 allowing a small volume of air to pass through the openings in the wafer. When the diaphragm is expanded the air is pulled away from the housing, and the wafer in the outlet valve reseats on surface 53 and blocks passage of air; the wafer in the inlet valve now moves away from its seated surface 51 allowing air to enter the housing to replace the volume of air that was removed through the outlet valve. The relatively small shift or air that passes between the valves is sufficient to deliver 5 liters of air in 15 minutes at the outlet of the sampler. At the conclusion of the sampling period, the timer terminates the current and the device ceases the pumping operation. The colorimetric tube referred to above has been reacted by 5 liters of sampled air and the coloration in the tube may now be determined quantitatively.

It will be appreciated that various alternative embodiments other than those disclosed herein may be employed in the device of the present invention and that this invention is only to be limited by the scope of the claims appended thereto.

What is claimed is:

1. A gas sampling apparatus comprising a gaseous flow rate indicator, a gaseous flow regulator, a pump assembly which includes a bellows having oppositely disposed movable walls defining an inner space, a valve housing containing an inlet valve and an outlet valve adapted to open and close alternately in accordance with the action of said bellows, a rigid conduit attached to one of said walls and connecting said inner space of said bellows to said housing at an intermediate point between said valves, a flexible arm supported at one end and having a U-shaped permanent magnet at its other end, a coil in spaced relationship to said magnet for vibrating said arm in response to alternating current, said arm being connected at a intermediate point between its ends to the other of said walls, means for actuating said coil in response to alternating current and gas conduits connecting said indicator, said regulator and said housing.

2. A gas sampling apparatus comprising a gaseous flow rate indicator including a gas flow regulator mounted in front of a panel, a pump assembly mounted in back of said panel, said assembly including a bellows having oppositely disposed flexible walls defining an inner space, a valve housing having an inlet valve and an outlet valve, said valves adapted to open and close alternately in accordance with the action of said bellows, a rigid conduit attached to one of said walls and connecting said inner space of said bellows to said housing at an intermediate point between said valves, a vibrating arm supported at one end and having a permanent magnet at its other end, said arm being attached at an intermediate point between said ends to the other of said walls, a coil positioned adjacent to said magnet for vibrating said arm, means for interrupting the gaseous flow and gas conduits connecting said indicator and said housing.

References Cited in the file of this patent

UNITED STATES PATENTS

| | | |
|---|---|---|
| 2,228,565 | Haddaway | Jan. 14, 1941 |
| 2,258,023 | McKernon | Oct. 7, 1941 |
| 2,363,478 | Boeke | Nov. 28, 1944 |
| 2,413,261 | Stackhouse | Dec. 24, 1946 |
| 2,968,536 | Smith | Jan. 17, 1961 |

FOREIGN PATENTS

| | | |
|---|---|---|
| 703,079 | Great Britain | Jan. 27, 1954 |